L. E. WATERMAN.
PLANTER.
APPLICATION FILED DEC. 19, 1911.

1,166,502.

Patented Jan. 4, 1916.
2 SHEETS—SHEET 1.

Witnesses:
W. L. Dow
E. Behel

Inventor:
Lewis E. Waterman
By A. O. Behel
Atty.

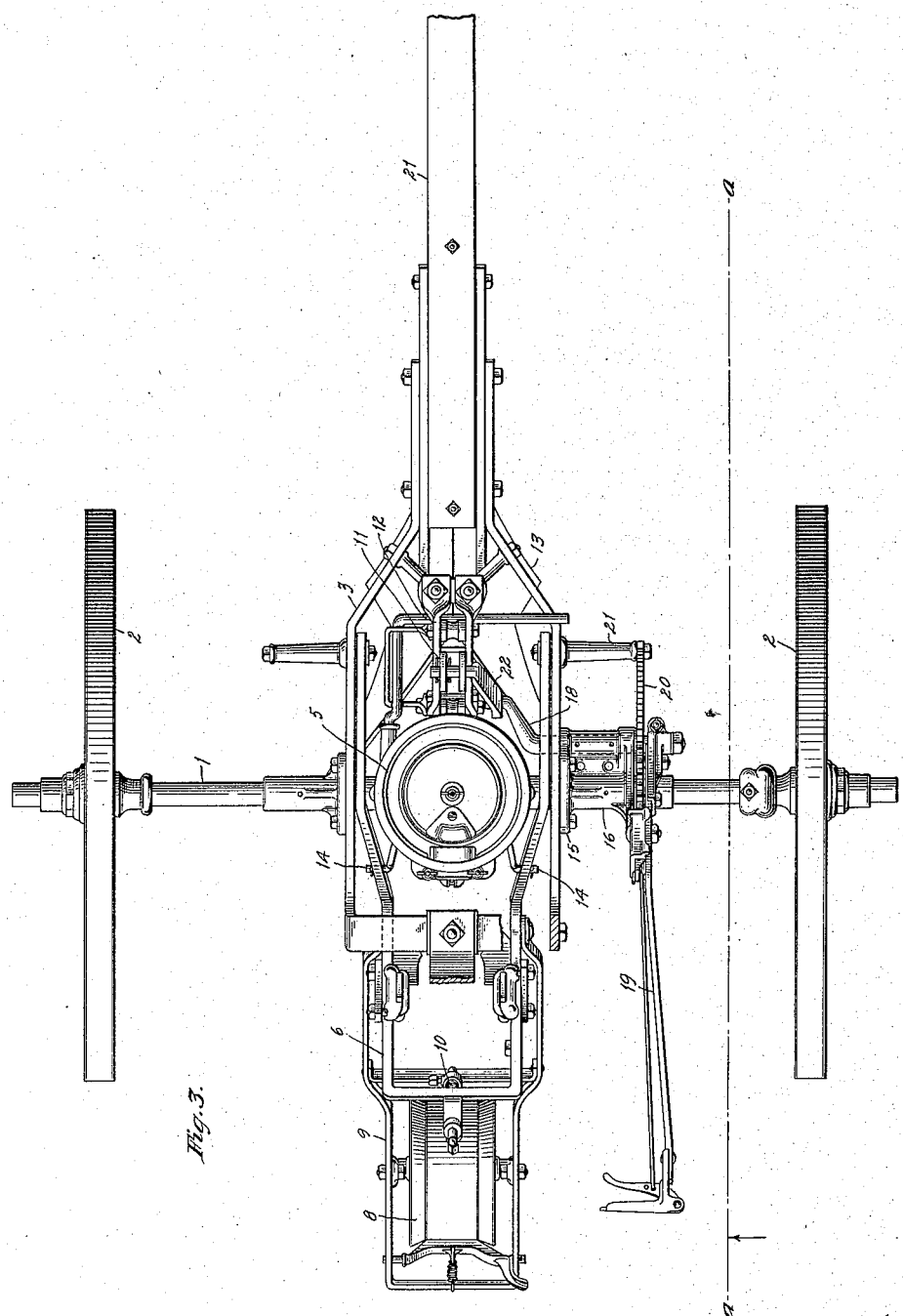

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

PLANTER.

1,166,502.  Specification of Letters Patent.  Patented Jan. 4, 1916.

Application filed December 19, 1911. Serial No. 666,861.

*To all whom it may concern:*

Be it known that I, LEWIS E. WATERMAN, a citizen of the United States, residing at Rockford, in the county of Winnebago and State of Illinois, have invented certain new and useful Improvements in Planters, of which the following is a specification.

This invention relates to planters and has more particular reference to those known as listers, which employ a sweep or middle-bursting furrow opener for preceding the planting means providing an even seeding bed and covering-shovel means following said planting means for covering the seeds.

One of the primary objects of this invention is to provide a lister of improved construction, whereby a light frame is obtained and the seeding and furrow opening and covering means may be compactly arranged, and whereby the lister may be manufactured at a low cost.

Another object of my invention is to provide a lister having a vertically movable sweep-stock and covering shovel frame, a connection between the two devoid of adjusting levers and so arranged that upon moving the sweep-stock vertically the covering-shovel frame will be moved vertically thereby but in a range of movement different from that of the sweep-stock and wherein the two will operate at different levels.

A further object is to provide an improved means for raising and lowering the sweep-stock and covering-shovel frame in unison by the operation of but a single lever.

I also aim to provide a covering-shovel frame pivoted forward of the supporting-wheel axle and extending over and to the rear of said axle, with the shovel means of said frame at the rear of the axle, also to provide a main frame comprising side-bars joined at their rear ends and raised above the plane of the frame to permit the covering-shovel frame to be elevated a given distance.

Figure 1:
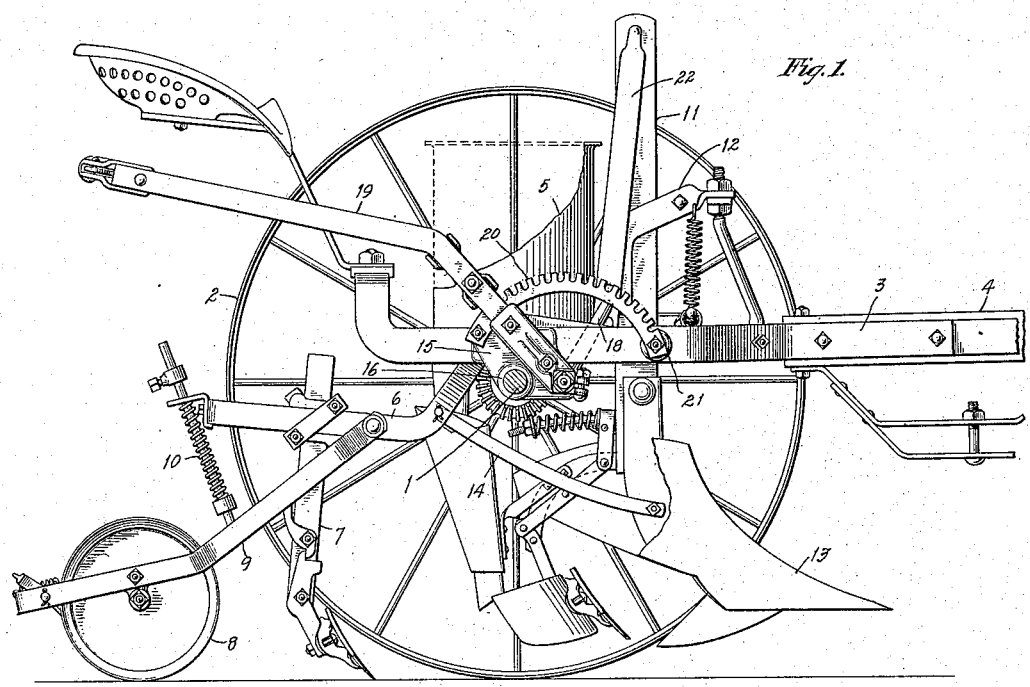
Figure 2:
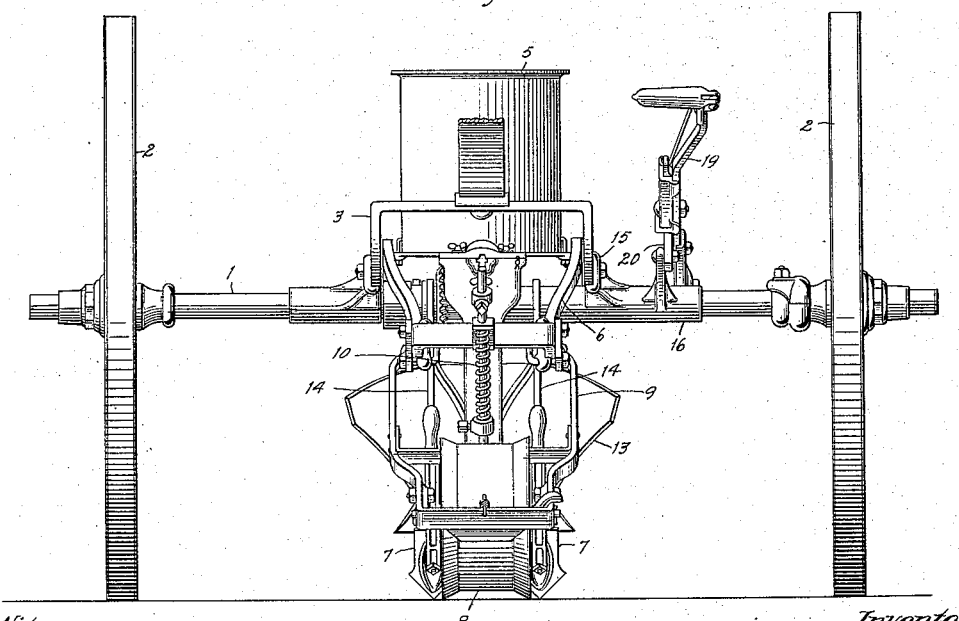

In the accompanying drawings, Figure 1 is a section on line *a a* Fig. 3. Fig. 2 is a rear elevation. Fig. 3 is a plan view.

The axle 1 is supported by the wheels 2. A main frame 3 is supported by the axle 1, and a tongue 4 is connected to the main frame.

A seed box 5 is supported by the main frame, and to the main frame is pivoted a frame 6 supporting the covering shovels 7. A roller 8 is pivotally supported in a frame 9 pivotally connected to the frame 6 and held downward in a yielding manner by the spring 10.

A sweep stock 11 is guided in a vertical manner by the frame 12, and to its lower end is secured a sweep 13. Two bars 14 have one end pivotally connected to the sweep stock, and their upper ends pivotally connected to the frame 6 supporting the covering shovels 7.

To one of the side bars of the main frame 3 is secured a bracket 15 having a sleeve extension 16 receiving the axle 1. This bracket has a forward extension 17 within which is pivotally supported a crank 18.

A hand lever 19 has a fixed connection with the crank 18 and is provided with the usual dog and thumb latch. A toothed segment 20 is supported by the extension 16 and by a stud 21 extending from the main frame. The dog of the hand lever engages the teeth of this segment.

A link 22 has one end pivotally connected to the upper end of the sweep stock 11 and its other end pivotally connected to the crank 18.

By moving the hand lever 19, the crank 18 will be rocked which will move the sweep stock vertically, through the link connection. The sweep will be moved with the sweep stock.

In the raising movements of the sweep stock, the bars 14 will raise the frame 6 thereby elevating the shovels 7, so that the sweep and covering shovels are raised and lowered in unison.

I claim as my invention:

1. In a lister, the combination, with a frame, of a middle-bursting furrow opener standard mounted vertically adjustable on the frame, means for raising and lowering the standard, a covering-shovel supporting frame pivotally mounted at its forward end on the frame in proximity to said standard, and means pivotally connecting the shovel frame with the standard at the lower portion of the same whereby the shovel frame will be raised and lowered by the standard but through a vertical range of movement different from that of the standard.

2. In a lister, the combination with a frame, of a middle-bursting furrow opener standard mounted vertically adjustable on the frame, means for raising and lowering the standard, a covering-shovel supporting frame pivotally mounted at its forward end on the frame, and means pivotally connected to the lower portion of the standard and to the rear portion of the shovel frame whereby the shovel frame will be raised and lowered by the standard through a range of vertical movement different from that of the standard.

In testimony whereof I have hereunto set my hand in presence of two subscribing witnesses.

LEWIS E. WATERMAN.

Witnesses:
A. O. BEHEL,
E. D. E. N. BEHEL.

Copies of this patent may be obtained for five cents each, by addressing the "Commissioner of Patents, Washington, D. C."